United States Patent [19]

Saalasti

[11] Patent Number: 4,525,284
[45] Date of Patent: Jun. 25, 1985

[54] METHOD FOR THE CLARIFICATION OF WATER

[76] Inventor: Vaino T. Saalasti, Arinatie 4, SF-00370 Helsinki, Finland

[21] Appl. No.: 494,100

[22] Filed: May 12, 1983

[30] Foreign Application Priority Data

Jul. 21, 1982 [FI] Finland .................................. 822575

[51] Int. Cl.³ ............................................. B01D 33/30
[52] U.S. Cl. .................................. 210/777; 210/780; 210/783; 210/805
[58] Field of Search ............... 210/777, 780, 783, 805, 210/806

[56] References Cited

U.S. PATENT DOCUMENTS

| 3,335,862 | 8/1967 | Hirs | 210/780 |
| 3,486,621 | 12/1969 | Hirs | 210/777 X |
| 3,497,063 | 2/1970 | Hirs | 210/783 X |
| 3,531,404 | 9/1970 | Goodman et al. | 210/783 X |
| 4,160,732 | 7/1979 | Maffet | 210/777 X |

*Primary Examiner*—Thomas Wyse
*Attorney, Agent, or Firm*—Browdy and Neimark

[57] ABSTRACT

The invention is concerned with the clarification of waters that contain usable sludge, fibres or equivalent. The objective is to recover the usable material, e.g., as fuel and at the same time to prevent pollution of waters. According to the invention, the separation of the solids, such as fibres and any other utilizable material, from the water takes place so that the water containing solid material is fed into or onto a mobile and utilizable layer of material placed on a perforated moving base, e.g. a wire-bottom conveyor (5), so that this material layer functions as a filter.

The invention is in particular suitable for the wood processing industry, wherein the water coming from the barking drum (1) is passed into a clarifier tank (7), from which the water containing fibres is pumped onto a layer of bark material carried on a wire-bottom conveyor (5), whereby the bark layer filters the water passing through the bark layer.

Likewise, water containing solids can be pumped from a waterway or clarifying basin into or onto a bark layer placed on a wire-bottom or equivalent conveyor to be filtered there, whereat the solids in the water remain in the bark material and pass along with the bark material, e.g. into a dewatering drum, and the water filtered through the bark layer passes back into the waterway or clarifying tank. The filtered warm "circulating water" collected in the upper part of the clarifying tank (7) is pumped back into the barking drum (1).

7 Claims, 4 Drawing Figures

METHOD FOR THE CLARIFICATION OF WATER

The present invention is mainly concerned with the clarification of waters that contain admixtures suitable for some purpose, such as fibres, flakes or small particles.

Such poorly clarifiable waters are produced as large quantities, e.g., in the wood-processing industry, such as in the barking plants of paper and pulp mills. In these same mills, heat energy is required, so that the fibres separated and dewatered can be burnt and converted to heat energy in existing boilers.

A great number of different methods for the treatment and clarification of such waters is known and in use in prior art.

Right from the beginning of this century until recent years, many paper and pulp mills have dumped their fibre-containing waste waters into rivers, lakes or into the sea. But, in this way, large sludge areas were formed and the surrounding waters and the downstream rivers and lakes were polluted.

Afterwards, waste water basins have been constructed on whose bottom the sludge sinks. The bottoms of the basins are cleansed by means of excavators, and the sludge from the bottoms is transported to the dumping ground.

As a result of protection of environment, e.g., in the United States, the transportation of such industrial wastes to the dumping ground has been prohibited.

This is why, e.g., circular clarifier basins have been constructed, on the bottom of which there is a constantly moving scraper which lifts the particles sedimented on the bottom out of the clarifier basin. This waste sludge pumped contains 2 to 6 percent of solids. The quantity of the solids is about 3 to 5 percent of the quantity of wood used.

It is difficult to dewater the sludge from the clarifier basins. For dewatering, centrifuges, rotary suction filters, wire filters, disc presses, etc. have been used.

As these have proved uneconomical in continual industrial operation, attempts have been made recently to develop particular combustion plants in which wet sludges and wastes could be burnt. This is, however, a poor method in view of energy economy, for the energy of the fibres and other combustible material contained in the wet sludges is consumed for evaporation of the water contained in the sludge. Often it may be doubtful whether useful energy is obtained even for the repayment of the operating expenses and maintenance of the combustion plant.

The objective of the present invention is to develop a method and an equipment for the separation of solid materials, such as fibres, bark particles or sludge, from water in a simple and reliable way so that the solid materials obtained can be utilized, e.g. be dewatered and by burning converted into heat energy or, as dewatered, be used for industrial raw-material.

The features characteristic of the method in accordance with the invention for the separation of solid materials, such as fibres, particles or sludge, from water so as to be utilized are specified in the characterizing part of claim 1.

The invention will be described in the following description and in the drawing of principle without in any way confining the invention to the schematical example cases of the present description or of the attached drawings.

In connection with the following exemplifying embodiments, it has been assumed that a BARK MASTER drum dewatering press is used, because the bark dewatering data have been obtained as results of measurement of bark dewatered by the said bark press.

Figure 1:
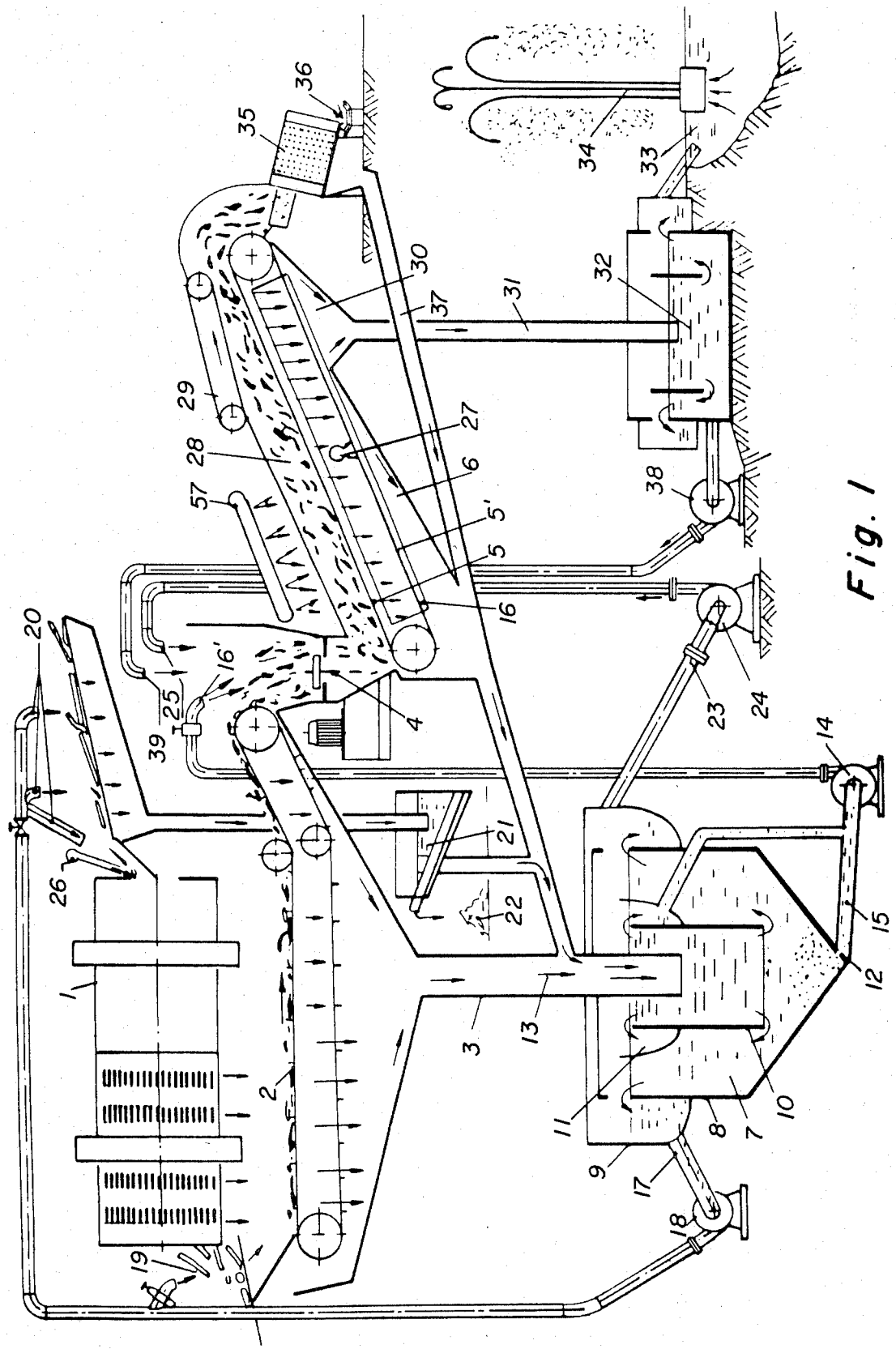
FIG. 1 illustrates the barking plant of a wood processing plant schematically in respect of the treatment of water, bark and sludge.

Part 1, FIG. 1, is the barking drum generally illustrated at 1, from which water, bark, fibres, and bark fines come at the bottom onto a flight conveyor 2. The conveyor 2 is provided with a perforated sheet bottom, so that much of the water coming from the barking drum flows down through the holes and the bark is dewatered on the conveyor to a dry solids content of $DS = 10$ to $15\%$. From underneath the conveyor, the water flows into a pipe 3. The temperature of this so-called "circulating water" is about 30° to 40° C. The water contains a lot of bark fibres and wood fibres as well as small bark particles.

The flight conveyor 2 allows the wet bark to fall into the shredder 4. The shredded bark comes out of the shredder onto a perforated-bottom, e.g. wire-bottom conveyor 5, whose speed is only 1/5 to 1/10 of the speed of the flight conveyor, the width, however, being equal. This is why, on the wire conveyor 5, a constantly moving bark layer 28 of uniform thickness is formed.

Underneath the wire conveyor 5, there is a slanting sheet 16 which guides any water filtered through the wire to the sides into spaces 6 and 30 so that the water filtered through the upper wire does not pass through the lower wire.

In stead of a wire-bottom conveyor, it is also possible to use a flight conveyor provided with a perforated bottom, the flights being arranged very densely so that the entire face is covered by the material to be transferred, e.g. bark.

It is this very bark layer 28 that is used for clarifying the water in the method in accordance with the present invention.

Above, it was mentioned that the circulating water of about 30° to 40° C. in the barking plant flows down through the holes in the flight conveyor 2 and, together with the water flowing from the initial part of the wire-bottom conveyor 5 into the space 6, flows along the pipe into the middle of a vertical clarifier 7 through its top portion.

The vertical clarifier 7 is a large container placed inside the barking plant building or, if it is placed outdoors, a container additionally provided with thermal insulation, whose dimensions are about $\phi$ 8 m, height 8 to 10 m. The size of the clarifier is determined by the quantity of circulating water required and by the quantity of water allowed to be passed into the waterways.

The vertical clarifier 7 consists of a vertical cylinder frame 8, outside of which, at the upper part, there is an annular collector tank 9 for clean water. Inside the vertical clarifier 7, there is a vertical cylinder or pipe 10, and outside the cylinder, at its upper part, there is an annular collector tank 11 for collecting light particles.

The bottom of the vertical clarifier 7 is conical, and at the middle there is an opening 12.

When the water 13 comes out of the pipe 3 into the pipe 10 in the middle of the vertical clarifier, any particles lighter than water, of bark and wood, rise onto the surface and are collected in the collector tank 11, from which they are carried along with water into a suction pipe 15 of a pump 14. The particles of bark heavier than water and the sand collected in the conical bottom portion of the vertical clarifier 7 end up through the opening 12 into the same suction pipe 15, and the pump 14 pumps this sludge, containing 2 to 6% of dry solids, through the nozzle 16' to the bark entering before the shredder 4.

The circulating water for the drum 1 and the jet water 17 for the wood to be barked, clarified in the vertical clarifier 7, are taken from the collector tank 9 and pressurized by means of a pump 18 so that sufficiently strong washing jets 19 and 20 are obtained.

The sand and the bark coming from the washing jets 20 along with the water end up in sand separator 21, and from there the water passes into the pipe 3 and the sand is heaped at 22.

If the water level becomes too high in the vertical clarifier 7, the water flows along the pipe 23 into the pump 24, which presses any excess water and the particles lighter than water floating on the water through the pipe 25 to the bark entering the shredder 4.

Warm water comes into the barking drum, e.g., from the paper mill along pipe 26 straight into the drum 1. Clean and warm water also comes to the washing jets 27 of the wire 5.

When the bark comes out of the shredder 4 onto the wire 5 moving slowly, at about 25 to 35 cm thick, a very wet bark layer 28 is formed on the wire.

From the initial end of the wire, the water flows through the upper wire 5 of the wire conveyor into the space 6 and from there further into the vertical clarifier 7. The final end of the wire conveyor is provided with a compression chain 29, which passes the bark layer down against the wire 5, so that quite clean water is filtered from the bark layer into the space 30, from where the water flows into a clarifier 32 placed outdoors. Only little sludge is formed herein. This sludge is also pumped by the pump 38 along pipe 39 to the bark entering the shredder 4. From the clarifier 32 the clean water flows further into waterway 33. In the waterway, there are a few aeration jets 34.

The bark layer 28 falls from the upper end of the wire 5 into a Bark Master bark dewatering press 35 operating by means of the multi-press method, and the conveyor 36 carries the dewatered bark to combustion. The "bark water" separated from the bark flows along the pipe 37 into the vertical clarifier 7.

The warm water 26 and the washing jets 27 introduce new water into the system. The system is adjusted so that the quantity of escaping water 31 is equal to the quantity of water introduced from the jets 26 and 27. In this way the warm circulating water always circulates only in the warm barking plant, and no heat losses arise, which is the case in such barking plants in which the circulating water of the barking plant is pumped out into large clarifying tanks and from there back into the barking plant.

If there is a paper mill or pulp mill near the barking plant, from which mill waste waters arrive that are difficult to clarify or that have a bad smell, it is advantageous to filter such waters through a bark layer. In particular the bark of pine is known as a good filtering material. The water to be filtered is introduced along pipe 57 and is distributed in a uniform flow over the bark layer 28.

The water is clarified when passing through the bark layer, and the fibres in the water remain in the bark, and most of the bad-smelling substances in the water and also absorbed in the bark and are passed to combustion along with the bark.

Figure 2:
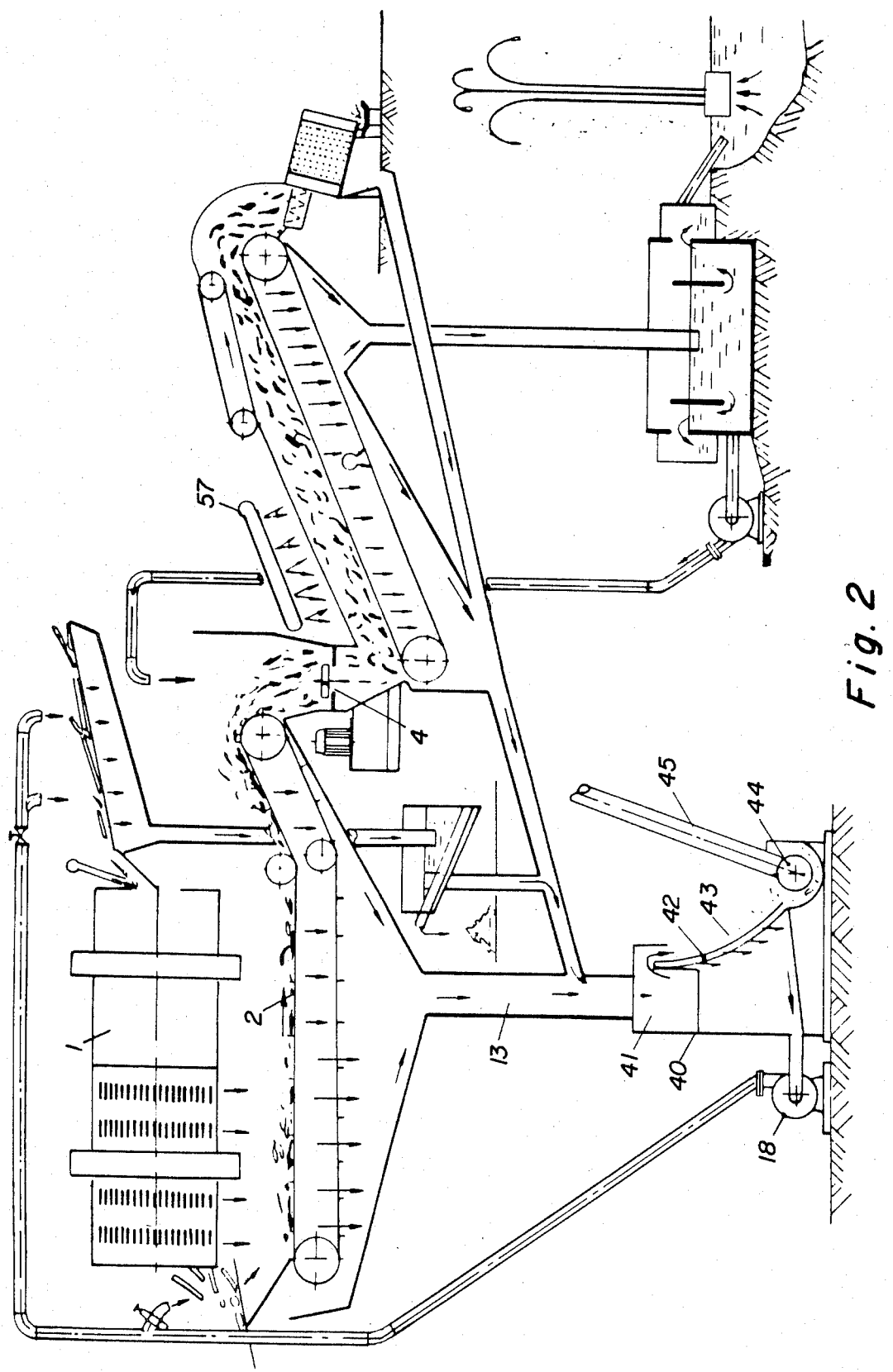
FIG. 2 shows another mode for the clarification of circulating water.

FIG. 2 shows another mode of preliminary cleaning of circulating water. According to FIG. 1, the circulating water was passed through a vertical clarifier 7. FIG. 2 shows the use of a curved screen 40 for preliminary clarification of circulating water. The water 13 passing from underneath the drum 1 through the conveyor 2 is passed into the equalizing tank 41 of the curved screen, from which tank it rises over the upper ends of the screens 42 and through the screens into the pump 18 and is pressurized further into the washing circulation.

The fines 43 separated from the circulating water remain on the screens, fall down into a screw conveyor 44 and are carried by a conveyor 45 to the bark entering the shredder 4.

The slit size of the screens 42 is 0.4 to 0.5 mm. Thereby, bark particles whose particle size is larger than 0.3 to 0.4 mm are separated from the water and end up among the bark at the shredder.

The holes in the conveyor 2 may be 6 to 8 mm. Large holes are kept open well, the 5 to 8 to 10 mm long bark particles passing through the holes keep the slit screens open when gliding on the slits down along with the water.

Figure 3:
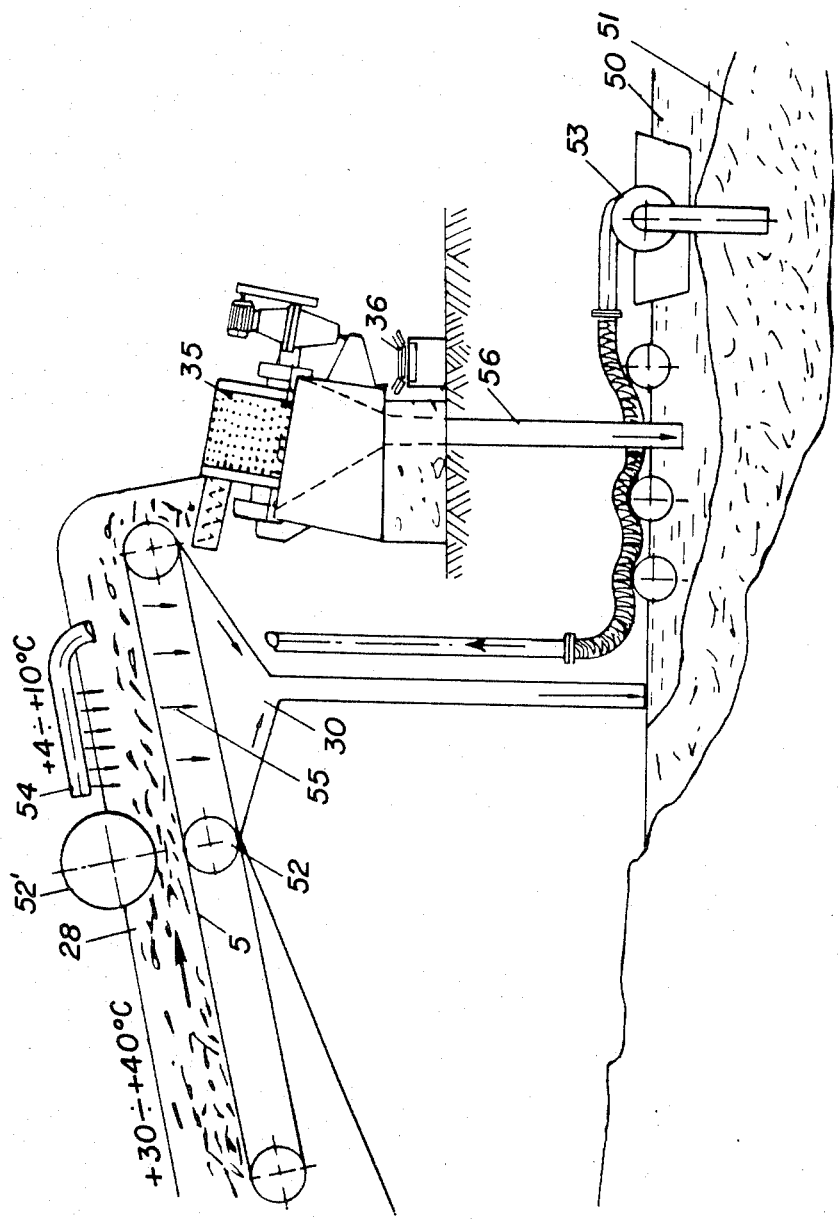
FIG. 3 illustrates a mode of utilization of the bark filtration method.

FIG. 3 illustrates the utilization of the fibre 51 accumulated in the course of time in the waters 50 around wood processing plants by means of the bark filtration method.

The wire conveyor 5 is, in a way, divided into two portions. At the initial portion, the warm water of 30° to 40° C. circulating in the barking plant is filtered. The rolls 52 and 52' compress the bark layer to such an extent that very much warm water does not enter to the "cold" side, to which a dredger pump 53 pumps sludge 51 by means of a distributor 54 evenly onto the bark layer 28. The cold water 55 flowing out of this lake water into the space 30 passes straight back into the lake. The bark and the cold fibres remaining therein fall from the upper end of the conveyor 5 into the Bark Master bark press 35, operating by means of the multi-press method, the dewatered bark with the fibres passes to combustion on the conveyor 36, and the water drained out of the bark passes straight into the waterway along pipe 56.

During the filtration, sludge has been introduced into the bark 28, so that the dry solids content of the bark before the bark press is only 10 to 12%.

This is why the bark must be dewatered by means of a Bark Master drum press, which operates by means of the multi-press method and which mixes the bark between pressing operations, whereat a dry solids content in excess of 40% is achieved.

The dry solids content of course depends on the quantity of sludge mixed along with the bark.

If a method in accordance with FIG. 1 is used only for dewatering of spruce bark from barking drum and of bark fines separated from the bark water, for the bark and fines dewatered by means of a Bark Master press operating by means of the multi-press method, a dry solids content in excess of 42% is achieved.

Figure 4:
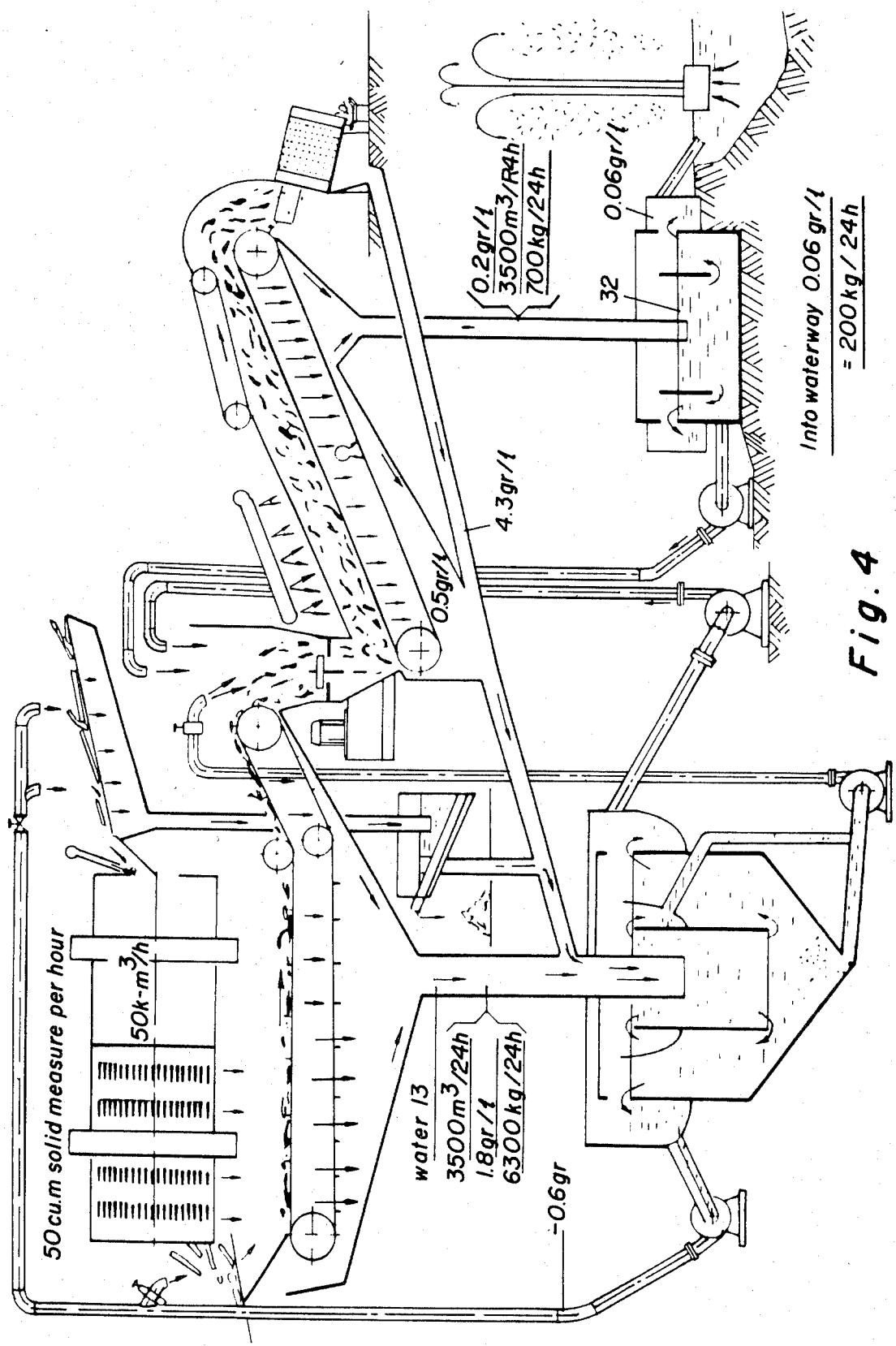
FIG. 4 shows the water quantities in the different flow circuits as well as the quantities of solids contained in the said water quantities.

In order to find out the results of bark filtration, let us examine the treatment of water from the barking plant of an example plant, FIG. 4:

The plant barks wood in a half-wet drum:
400,000 m³ solid measure per year,
50 m³ solid measure per hour.
The water 13 coming from the barking plant contains:
solid matter 1.8 g/l
water 3500 m³/24 h = 145 m³/h
solid matter 6300 kg/24 h = 260 kg/h.

This quantity of water and solids nowadays passes to the outdoor basin, to be emptied annually by dredger, from which basin 0.3 g/l of solids pass into the waterways, i.e. 1000 kg/24 h = 43 kg/h of solids pass into the waterways. The quantity of water used is 2.9 m³ per barked m³ solid measure of wood.

(I) When bark filtration is used, the same quantity of water escapes from the barking plant:
3500 m³ of water per 24 hours, but
the quantity of solids is 0.2 g/l, and
the quantity passing from the clarifying basin 32 into the waterways is
only 0.06 g/l,
i.e. 200 kg/24 h.

(II) However, there are barking plants which, with spruce bark, consume only 1.45 m³ of water per barked m³ solid measure of wood. According to this, the quantity of water would be:
70 m³/h = 177 m³/24 h.

Filtration by means of a bark layer gives a better result with a lower quantity of water, but, even if the calculation is performed at a
solids value of 0.2 g/l,
the quantity of solids passing into the outdoor clarifier 32 is
0.2 × 1700 = 340 kg/24 h, and into the waterways
70 kg of solids per 24 hours.

This would be only 1/15 of the quantity of solids at present passing into the waterways.

It should be noticed in particular that the procedure in accordance with the invention is simple and reliable and the dewatering of the bark fines requires no centrifugal separators, suction filters, double-wire presses or sludge presses, but the fines pass to combustion along with the bark.

Moreover, the above good clarification result, of high value for the conservation of waters, is achieved with the bark waters.

What is claimed is:

1. In a method for the separation of solid organic materials such as fibers, bark particles or bark sludge from water for the purpose of dewatering and utilizing said organic materials to make fuel, the improvement comprising
    providing a first porous conveyor and placing on said porous conveyor a thick, mobile layer consisting of constantly renewable, utilizable organic bark material in coarse particulate form;
    filtering water containing said solid organic materials through said thick layer of organic material by passing said water through said layer and extracting clarified water from beneath the porous conveyor; and
    removing from the surface of said porous conveyor said constantly renewable, utilizable organic material in coarse particulate form and said solid organic materials which have been filtered from the water, said materials removed from said porous conveyor being suitable for use as fuel.

2. A method according to claim 1 for the separation of wood fibers to be burnt from water to provide a dewatered fuel product, said organic bark material in coarse particulate form being crushed bark, and wherein the wet bark, and said organic materials in the form of wood fibers separated from water, at the downstream end of said conveyor, are squeezed to effect dewatering thereof, the resultant product being a mixture of the crushed bark and the fibers filtered from the water by the crushed bark.

3. The method of claim 2, further comprising the steps of:
    providing a barking drum;
    passing bark obtained from said barking drum onto a second conveyor, said second conveyor having a perforated bottom plate;
    flowing water over said bark on said conveyor and through said perforated bottom plate to obtain a contaminated water fraction comprising bark particles and wood fibers;
    passing said contaminated water fraction through a curved screen to form a semiclarified water fraction and a layer of material upon said screen comprising bark fines and wood fibers;
    pumping said semiclarified water fraction into said barking drum to provide circulating water therefor;
    conveying said bark from said barking drum and said material comprising bark fines and wood fibers to a bark shredder.

4. The method of claim 2 comprising the steps of:
    selecting said conveyor to comprise an initial section and a final section;
    filtering warm water from a barking drum through said initial section of said conveyor;
    pumping said filtered warm water and the water from said dewatering step into said barking drum to provide circulating water therefor;
    pressing said crushed bark from said initial portion of said conveyor to effect the dewatering of said crushed bark;
    passing said dewatered bark onto said final portion of said conveyor;
    pumping cold water comprising sludge from a body of water onto said dewatered bark to obtain filtered cold water;
    passing said filtered cold water back into said body of water.

5. The method of claim 1, further comprising the steps of:
    selecting said organic bark material to comprise crushed bark;
    pumping sludge from the bottom a body of water comprising sludge onto the upper surface of said crushed bark on said first conveyor thereby filtering said sludge through said crushed back to obtain filtered water.

6. A method for the separation of solid materials such as fibers, sediment or sludge from water for the purpose of utilization, comprising the steps of:
    providing a first porous conveyor and placing on said porous conveyor a thick, mobile layer of constantly renewable, utilizable organic material in coarse particulate form;
    filtering water containing said solid materials such as fibers, sediment or sludge through said thick layer of organic material by passing said water through said layer and extracting clarified water from beneath the porous conveyor;

providing a barking drum;

passing bark obtained from said barking drum onto a second conveyor, said second conveyor having a perforated bottom plate;

flowing water over said bark on said conveyor and through said perforated bottom plate to obtain a contaminated water fraction comprising bark particles;

admitting said contaminated water fraction into the upper portion of a vertical clarifying tank;

allowing said bark particles and allowing said contaminated water to settle, forming a first layer of material comprising bark particles and wood fiber at the bottom portion of said clarifying tank and a second layer of material comprising bark particles and wood fibers at the upper portion of said clarifying tank;

pumping said first and second layers of material from said clarifying tank onto said first porous conveyor;

feeding said dewatered wet bark on said first conveyor through a bark shredder;

admitting water obtained from said dewatering step into the upper portion of said clarifying tank.

7. The method of claim 6 further comprising the step of pumping clarified water from the upper portion of said clarifying tank into said bark drum to provide circulating water therefor.

* * * * *